(12) United States Patent
Al Salameh (10) Patent No.: US 9,046,076 B1
(45) Date of Patent: Jun. 2, 2015

(54) RAIL MOUNTED WIND TURBINE (71) Applicant: UMM AL-QURA UNIVERSITY, Makkah (SA)

(72) Inventor: Saleh Abdullah Al Salameh, Al Rass (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 0 days.

(21) Appl. No.: 14/218,894

(22) Filed: Mar. 18, 2014

(51) Int. Cl.
| *F03B 13/00* | (2006.01) |
| *F03B 13/10* | (2006.01) |
| *H02P 9/04* | (2006.01) |
| *F03D 1/00* | (2006.01) |
| *F03D 9/00* | (2006.01) |
| *F03D 7/02* | (2006.01) |

(52) U.S. Cl.
CPC ............... *F03D 7/0268* (2013.01); *F03D 1/00* (2013.01); *F03D 9/002* (2013.01)

(58) Field of Classification Search
USPC .................................. 290/43, 55; 416/16
See application file for complete search history.

(56) References Cited

U.S. PATENT DOCUMENTS

| 3,233,559 | A | | 2/1966 | Smith et al. ................. 104/292 |
| 4,242,043 | A | * | 12/1980 | Poulsen ......................... 416/11 |
| 4,362,466 | A | * | 12/1982 | Schonball .................... 416/142 |
| 4,449,889 | A | * | 5/1984 | Belden ......................... 416/16 |
| 4,630,996 | A | * | 12/1986 | Masaki ......................... 416/16 |
| 4,832,571 | A | * | 5/1989 | Carrol ...................... 416/132 B |
| 5,272,378 | A | | 12/1993 | Wither ......................... 290/1 R |
| 5,295,793 | A | * | 3/1994 | Belden ........................... 416/13 |
| 6,327,957 | B1 | * | 12/2001 | Carter, Sr. ...................... 91/41 |
| 6,974,307 | B2 | * | 12/2005 | Antoune et al. .................. 416/9 |
| 7,084,520 | B2 | * | 8/2006 | Zambrano et al. ............. 290/44 |
| 7,193,332 | B2 | | 3/2007 | Spinelli ....................... 290/1 R |
| 7,215,039 | B2 | * | 5/2007 | Zambrano et al. ............. 290/55 |
| 7,239,031 | B2 | | 7/2007 | Ricketts ...................... 290/1 R |
| 7,276,809 | B2 | * | 10/2007 | Zambrano et al. ............. 290/55 |
| 7,902,690 | B1 | | 3/2011 | Van Meveren et al. ......... 290/55 |
| RE43,014 | E | * | 12/2011 | Zambrano et al. ............. 290/55 |
| 8,102,073 | B2 | * | 1/2012 | Morrison ....................... 290/55 |
| 8,328,499 | B2 | | 12/2012 | Mauro et al. ................... 415/1 |
| 8,598,731 | B2 | * | 12/2013 | Pitre ............................. 290/55 |
| 8,692,405 | B2 | * | 4/2014 | Lavaur et al. .................. 290/55 |
| 8,779,618 | B2 | * | 7/2014 | Morrison ....................... 290/55 |
| 2005/0242590 | A1 | * | 11/2005 | Zambrano et al. ............. 290/44 |

(Continued)

FOREIGN PATENT DOCUMENTS

| CN | 102352820 A | 2/2012 |
| CN | 102410148 A | 4/2012 |
| GB | 2 451 588 A | 2/2009 |

*Primary Examiner* — Pedro J Cuevas
(74) *Attorney, Agent, or Firm* — Richard C Litman (57) ABSTRACT

A rail mounted wind turbine includes a pivotable housing placed between rails of a rail track. The pivotable housing can move into at least one upward position and at least one downward position and includes a wind turbine. The wind turbine has a blade that moves when a force, such as a wind force, is applied to provide mechanical energy to generate electrical power. An electrical generator communicates with the wind turbine to generate electrical power from the mechanical energy. A controller controls the movement of the pivotable housing into the at least one upward position and the at least one downward position. At least one sensor associated with the rail mounted wind turbine communicates with the controller to provide at least one signal to the controller to indicate a position of a vehicle operating on the rail track in relation to the pivotable housing.

20 Claims, 5 Drawing Sheets

(56) References Cited

U.S. PATENT DOCUMENTS

2007/0152454 A1* 7/2007 Zambrano et al. ............. 290/55
2010/0327602 A1  12/2010 Jordan ......................... 290/1 R
2011/0140443 A1*  6/2011 Morrison ....................... 290/55
2012/0112465 A1*  5/2012 Morrison ....................... 290/55
2014/0252770 A1*  9/2014 Patel et al. ..................... 290/50

* cited by examiner

RAIL MOUNTED WIND TURBINE

BACKGROUND OF THE INVENTION

1. Field of the Invention

The present invention relates to alternative energy systems, and particularly to a rail mounted wind turbine.

2. Description of the Related Art

Wind energy can offer many advantages in the field of alternative energy because the source of energy is wind, a relatively clean and unlimited source. An advantage of wind energy can include the lack of reliance on limited resources like fossil fuels, such as coal or natural gas, for example. Further, wind turbines that are generally used in the production of energy from wind generally don't produce certain emissions that are associated with the combustion of fossil fuels that occurs from other types of energy production, like oil energy production.

One possible disadvantage of wind energy is that the placement of wind turbines can be considered obstructive or unsightly in certain regions, or that the placement of wind turbines takes up useful resources, such as land. Another possible disadvantage with wind energy is that wind can be unpredictable, making accurate placement of wind turbines for optimum wind interaction possibly difficult to determine and/or obtain.

Therefore, it is desirable for a wind turbine to be capable of placement in an area that is generally not obstructive, an area in which useful resources are not taken up and further in an area in which the wind turbine can optimally interact with the wind.

Thus, a rail mounted wind turbine addressing the aforementioned problems is desired.

SUMMARY OF THE INVENTION

Embodiments of a rail mounted wind turbine are provided. The rail mounted wind turbine includes a pivotable housing that can be positioned between rails of a rail track. The pivotable housing can further be positioned into at least one upward position and at least one downward position relative to the rail track. A wind turbine having at least one blade is positioned within the pivotable housing. The at least one blade can move in a path when a wind force is applied to the at least one blade to provide mechanical energy to generate electrical power.

The rail mounted wind turbine further includes an electrical generator which communicates with the wind turbine so that the electrical generator can generate electrical power from the mechanical energy generated by the movement of the at least one blade of the wind turbine. A controller selectively controls the movement of the pivotable housing into the at least one upward position and into the at least one downward position. At least one sensor is associated with the rail mounted wind turbine and communicates with the controller to provide at least one signal to the controller indicating a position of a vehicle operating on the rail track in relation to the pivotable housing.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Referring to FIGS. 1, 2A, 2B, 2C and 3, embodiments of a rail mounted wind turbine 100 are illustrated. The rail mounted wind turbine 100 includes a frame 102 and a pivotable housing 104 associated with the frame 102. The frame 102 along with the associated pivotable housing 104 can be positioned in conjunction with a rail track 106, as shown in FIGS. 1, 2A, 2B and 2C, for example. The rail track 106 can be any number of various rail tracks or railroad tracks, such as used by freight trains on freight railroads, passenger railroads, local and regional railroad lines, and commuter railroad lines such as subways and metro systems, among others, for example, and should not be construed in a limiting sense.

Figure 2A:
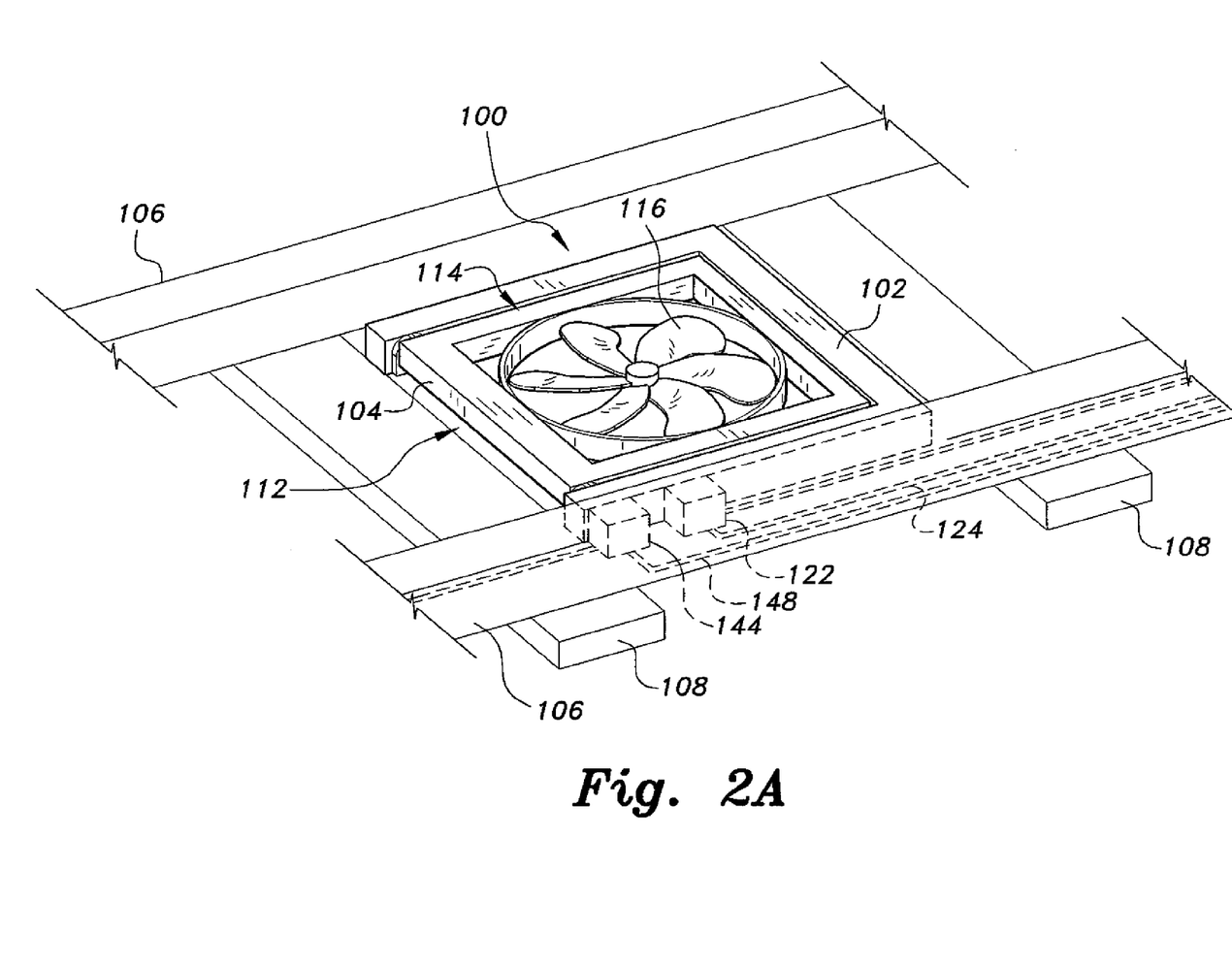
FIG. 2A is a sectional environmental view of an embodiment of a rail mounted wind turbine in a downward position according to the present invention.
Figure 2B:
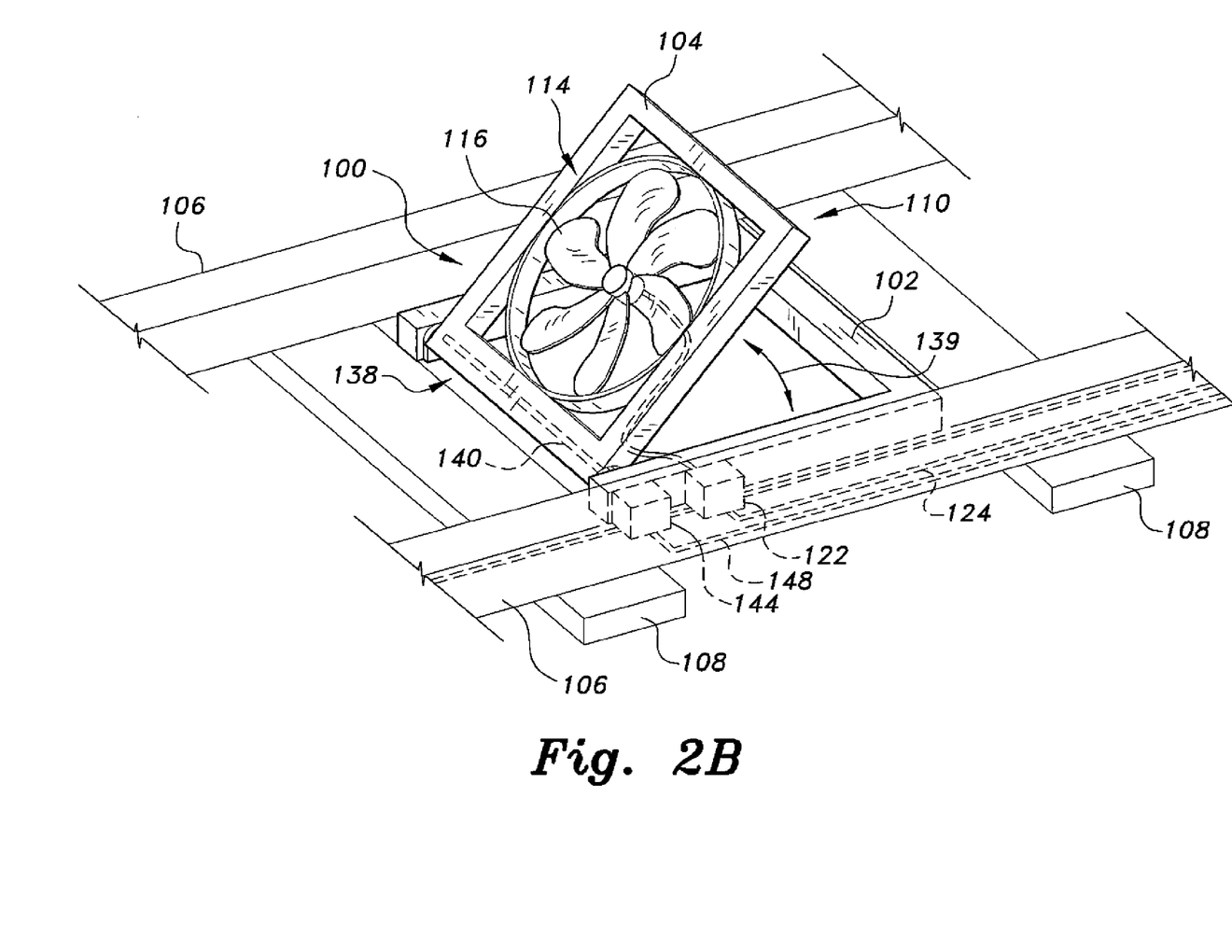
FIG. 2B is a sectional environmental view of an embodiment of a rail mounted wind turbine in an upward position according to the present invention.
Figure 2C:
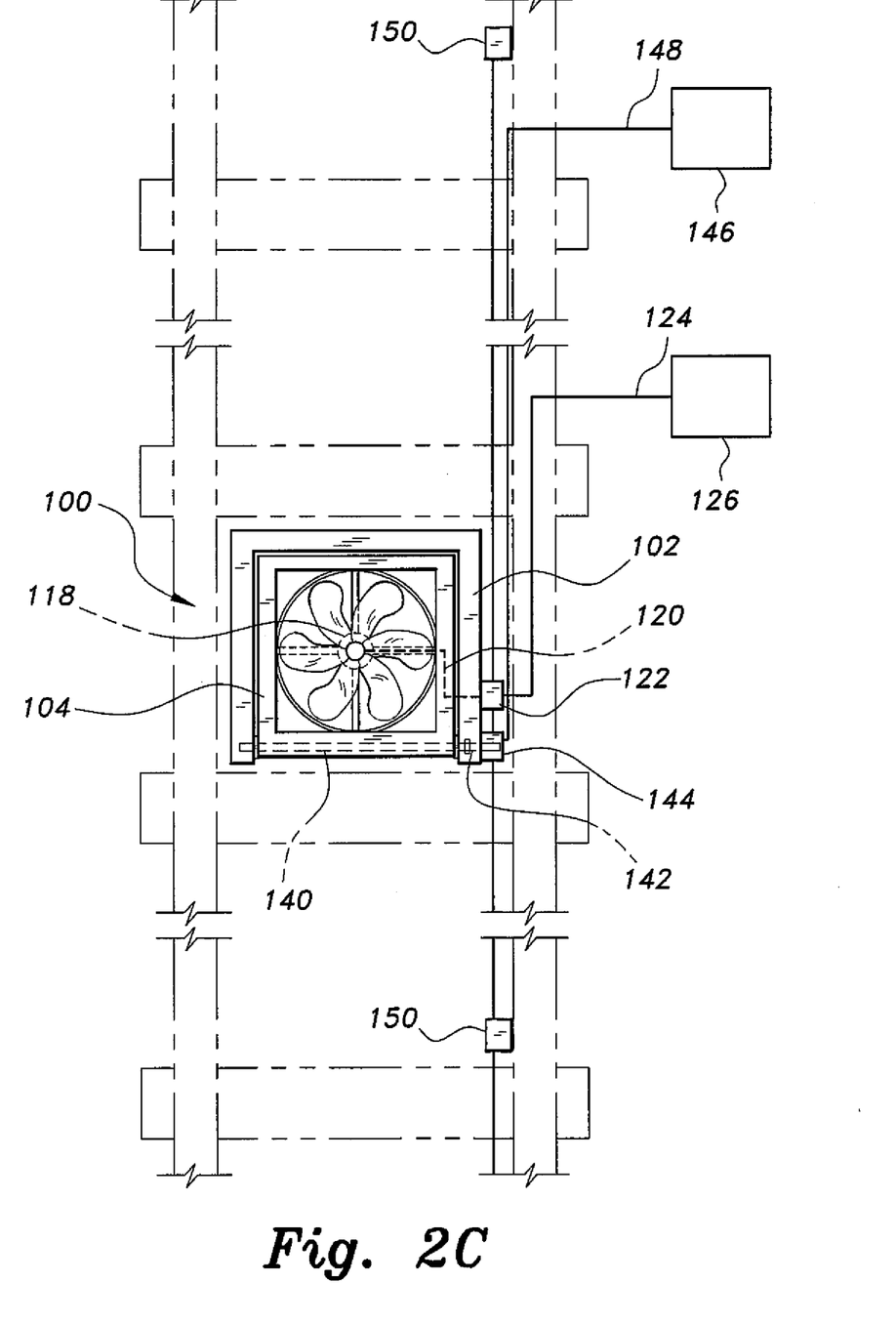
FIG. 2C is a top environmental view of an embodiment of a rail mounted wind turbine in the downward position according to the present invention.

The frame 102 with the associated pivotable housing 104 of the rail mounted wind turbine 100 can be further positioned between a plurality of ties 108 of the rail track 106, as shown in FIGS. 2A-2C. The frame 102 can be mounted or secured between the plurality of ties 108 of the rail track 106 by any number of securing mechanisms, such as threads, wires, clamps, bolts, or an adhesive, among other various securing mechanisms, for example. By positioning the frame 102 along with the attached pivotable housing 104, the rail mounted wind turbine 100 can be placed in a location that typically does not obstruct any paths and typically does not substantially take up any resources as can be used for other purposes, such as unoccupied land, for example.

Further, by positioning the frame 102 with the associated pivotable housing 104 between corresponding ties 108 of the rail track 106, the rail mounted wind turbine 100 can utilize a force, such as a wind force, that is generated by a vehicle 152 operating on the rail track 106. The vehicle 152 can be a number of various rail vehicles, such as a freight train, a passenger train, a rail maintenance motorized car and a commuter train, such as a subway train with at least one subway car, a street car, and a cable car, among others, for example, and should not be construed in a limiting sense.

Positioned within the pivotable housing 104 of the rail mounted wind turbine 100 is a wind turbine 114. The wind turbine 114 allows for a mechanical energy to be generated when a force, such as a wind force, is applied to the wind turbine 114. More specifically, the wind turbine 114 includes at least one blade 116, and typically can include a plurality of blades 116, that when a force such as a wind force is applied to the wind turbine 114, the at least one blade 116 moves in relation to the force, such as a wind force. The movement of the at least one blade 116 of the wind turbine 114, such as movement of the at least one blade 116 in a path, allows for the mechanical energy to be generated by the wind turbine 114. For example, the wind turbine 114 having at least one blade 116 can be rotatable in a path relative to a center point of the wind turbine 114 when a wind force is applied to the at least one blade 116 to provide mechanical energy to generate electrical power, such as illustrated in FIGS. 2A, 2B and 2C, for example. The wind force that is applied to the at least one blade 116 can be generated by the vehicle 152 that is operating on the rail track 106, such as by the vehicle 152's movement on or position on the rail track 106, or can be generated by a wind force applied to the at least one blade 116 of the wind turbine 114, irrespective of the vehicle 152's movement on or position on the rail track 106, for example, and should not be construed in a limiting sense.

The wind turbine 114 communicates with an electrical generator 118 so that the mechanical energy generated by the movement of the at least one blade 116 when the wind force is applied can be turned into generated electrical power. The electrical generator 118 can be any number of common, suitable electrical generators and can be positioned in conjunction with the pivotable housing 104 or the wind turbine 114 or any other suitable place that can allow for the mechanical energy generated by the wind turbine 114 to be transmitted to the electrical generator 118 to drive the electrical generator 118 to generate electrical power.

The pivotable housing 104 of the rail mounted wind turbine 100 can be selectively positioned into various upward and downward positions, such as shown in FIGS. 2A-2B. For example, as shown in FIGS. 2A and 2B, the pivotable housing 104, and the associated wind turbine 114 can be placed into at least one upward position 110 relative to the rail track 106 and can be placed into at least one downward position 112 relative to the rail track 106, by pivotal motion of the pivotable housing 104, the pivotal motion being indicated by the double-arrowed line 139, for example. The double-arrowed line 139 also indicating a range of positions of the pivotable housing 104 including one or more upward positions 110 and one or more downward positions 112, for example, but should not be construed in a limiting sense.

By placing the pivotable housing 104 in at least one upward position 110, the wind turbine 114 can utilize any existing force, such as the wind force from wind blowing naturally across the rail track 106, to generate mechanical energy by the at least one blade 116 without a need for a vehicle 152 to be operating on the rail track 106. This can allow for the rail mounted wind turbine 100 to generate electrical power at various times when a wind force is present. Thus, the at least one blade 116 of the wind turbine 114 is adapted to be selectively movable when the wind force is applied to the at least one blade 116 when the pivotable housing 104 is positioned into one or more of the at least one upward position 110 relative to the rail track 106 and the at least one downward position 112 relative to the rail track 106 to generate the mechanical energy to drive the electrical generator 118 to generate electrical power.

As discussed, the pivotable housing 104 can be further selectively positioned into at least one downward position 112, such as shown in FIG. 2A. When the pivotable housing 104 is in the at least one downward position 112, the wind force generated by the operating vehicle 152 can be utilized by the wind turbine 114 to generate mechanical energy. Thus, the electrical generator 118 is adapted to generate electrical power when the pivotable housing 104 is positioned either into the at least one upward position 110 relative to the rail track 106 or into the at least one downward position 112 relative to the rail track 106, as long as a wind force is applied to the wind turbine 114 so that the at least one blade 116 moves in relation to the wind force that is applied to the at least one blade 116. Further, by having the pivotable housing 104 capable of being placed into a downward position of the at least one downward position 112 that is located at or below an upper surface of the rail track 106, for example, the rail mounted wind turbine 100 can be out of the path of any vehicle 152 operating along the rail track 106.

The electrical generator 118 allows for the mechanical energy generated by the wind turbine 114 through the movement of the at least one blade 116 when a force, such as a wind force, is applied to the at least one blade 116 for the generation of the electrical power. The electrical generator 118 can be in communication with transformer 122, such as a step-up transformer or a step-down transformer, as can depend on the electrical energy being generated and transferred, for transferring of the electrical power generated by the electrical generator 118, or the transformer 122 can be by passed, depending on the particular use or application, for example. The electrical generator 118 can be in communication with the transformer 122 through a generator communication line 120.

The electrical generator 118 is in further communication with an energy storage device 126 through a storage communication line 124. The energy storage device 126 can be any number of common energy storage devices, such as power grid, one or more capacitive storage devices, and one or more batteries, for example, and should not be construed in a limiting sense. The energy storage device 126 can allow for the electrical power generated by the electrical generator 118 to be stored and also used, such as by a consumer or other users, for an application that requires electrical power.

Figure 3:
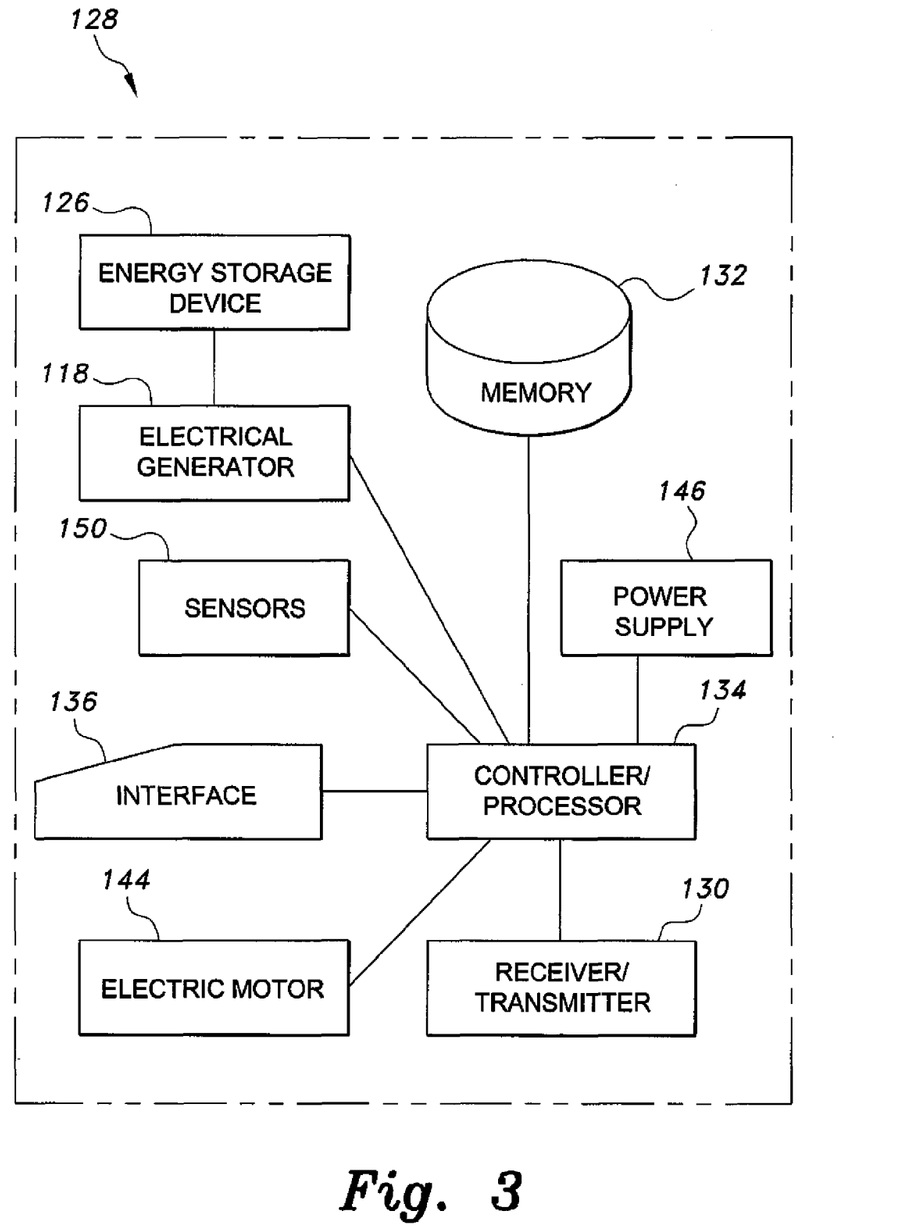
FIG. 3 is a schematic diagram of an embodiment of a generalized system including a controller as can be used in implementing generation of electrical power in embodiments of a rail mounted wind turbine according to the present invention.

An embodiment of a generalized system 128 is illustrated in FIG. 3 including a controller/processor 134 as can be used in implementing generation of electrical power in embodiments of a rail mounted wind turbine, such as the rail mounted wind turbine 100. A controller, such as the controller/processor 134, shown in FIG. 3, is adapted to control the selective movement of the pivotable housing 104. The selective movement of the pivotable housing 104 controlled by the controller/processor 134 includes the movement of the pivotable housing 104 into the at least one upward position 110 in relation to the rail track 106 or into the at least one downward position 112 in relation to the rail track 106.

Such selective movement of the pivotable housing 104 can include movement of the pivotable housing 104 from the at least one downward position 112 into the at least one upward position 110 in relation to the rail track 106 and from the at least one upward position 110 into the at least one downward position 112 in relation to the rail track 106, or can include movement from one upward position 110 to another upward position 110 in relation to the rail track 106 or can include movement from one downward position 112 to another downward position 112 in relation to the rail track 106, for example. This selective movement of the pivotable housing 104 that is controlled by the controller/processor 134 can be accomplished through control and operation of a pivoting mechanism 138 that is associated with the pivotable housing 104, for example.

The pivoting mechanism 138 is associated with a motor 144 that drives the selective movement of the pivotable housing 104. The motor 144 can be any common motor, such as an electric motor. If the motor 144 selected is an electric motor, the electric motor can be powered by a power supply 146 through a power supply line 148, the controller/processor 134 controlling selective operation of the motor 144 and controlling selective delivery or providing of power to the motor 144 from the power supply 146. The motor 144 is selectively driven by the controller/processor 134 to drive the selective movement of the pivotable housing 104 to selectively move and position the pivotable housing 104 into the at least one upward position 110 relative to the rail track 106 and into the at least one downward position 112 relative to the rail track 106.

The pivoting mechanism 138 can include an axle 140 to rotatably move the pivotable housing 104 along with a rotor 142. The axle 140 and the rotor 142 are in conjunction with the motor 144 so that when the motor 144 is selectively driven by the controller/processor 134, the motor 144 drives the rotor 142 along with the axle 140 which drives the selective movement of the pivotable housing 104 into the at least one upward position 110 relative to the rail track 106 and into the at least one downward position 112 relative to the rail track 106.

At least one sensor 150, as shown in FIG. 2C, for example, is associated with the rail mounted wind turbine 100, and the rail mounted wind turbine 100 can be associated with a plurality of sensors 150 positioned or located at various locations along the rail track 106, for example. The at least one sensor 150 is adapted to communicate with the controller/processor 134, either directly by a communication line, through a receiver/transmitter 130 or through an interface 136, or by a combination thereof, or the like, so that at least one signal is relayed to the controller/processor 134 to indicate a relative position of the vehicle 152 operating on the rail track 106, such as the presence or absence of the vehicle 152 on at least a corresponding portion of the rail track 106. For example, if a vehicle 152, such as a freight train or a passenger train, is operating along the rail track 106, a sensor 150 obtains the information of the position of the vehicle 152 and relays that position information to the controller/processor 134.

The controller/processor 134, based upon the received at least one signal from the at least one sensor 150, can then control the selective movement of the pivotable housing 104 by selectively driving the motor 144, which in turn drives the axle 140 and the rotor 142, to selectively move the pivotable housing 104 so that the pivotable housing 104 and the wind turbine 114 can be selectively moved into the at least one upward position 110 and into the at least one downward position 112 in relation to the track 106. Such selective positioning of the pivotable housing 104 can enable the rail mounted wind turbine 100 to be placed in a position that either or both of does not interfere with the operation of the vehicle 152 along the rail track 106 or in a position that can enable movement of the at least one blade 116 of the wind turbine 114 by a force, such as by a wind force, applied to the at least one blade 116, to provide mechanical energy to generate electrical power by the electrical generator 118, for example.

As discussed, the at least one sensor 150 can communicate with the controller/processor 134 through a number of communication mechanisms, such as through a receiver/transmitter arrangement 130, that allows for a signal to be relayed to, from or between the controller/processor 134 and the at least one sensor 150. Further, the at least one sensor 150 can be any number of suitable sensors, for example an acoustic sensor, a vibrational sensor, an infrared (IR) sensor, a pressure sensor, and a heat sensor, among others that allow for the at least one sensor to obtain positional information, or can obtain other information, such as speed information, of the vehicle 152 operating along the rail track 106, and should not be construed in a limiting sense.

Thus, the controller/processor 134, based upon the received at least one signal from the at least one sensor 150, selectively drives the motor 144 to selectively move the pivoting mechanism 138 to selectively move the pivotable housing 104 into the at least one upward position 110 relative to the rail track 106 and into the least one downward position 112 relative to the rail track 106. The motor 144, which is in communication with the pivotable housing 104, is controlled by the controller/processor 134 to drive movement of the pivotable housing 104 to move the pivotable housing 104 into the at least one upward position 110 relative to the rail track 106 and into the least one downward position 112 relative to the rail track 106, based upon the received at least one signal from the at least one sensor 150.

Referring to FIG. 3, the controller/processor 134 of the generalized system 128 includes or is associated with a memory 132 that can store programs or instructions to be implemented by the controller/processor 134, such as by a programmable processor of the controller/processor 134, for example, to control operation of and the generation of electrical power by the rail mounted wind turbine 100 and the storage of the generated electrical power in the energy storage device 126. The controller/processor 134, in this regard, for example, is in communication with and selectively controls the operation of the motor 144 and controls distribution of power by the power supply 146 to drive the motor 144, and selectively controls positioning of the pivotable housing 104, as well as can control the operation of the transformer 122 and the energy storage in the energy storage device 126.

The memory 132, can also store data and information, such as the positional or other information received form the one or more sensors 150, and information or data related to the generation of electrical power, for example. The receiver/transmitter 130 and the interface 136 are in communication with the controller/processor 134, as can provide, receive, transmit or send information, data, position signals, control signals or other signals to components of or associated with the wind turbine 100, as described, or other destinations, for example.

It should be understood that the controller/processor 134 can represent, for example, a stand-alone computer, computer terminal, portable computing device, networked computer or computer terminal, networked portable device, a programmable logic controller, or an application specific integrated circuit (ASIC), for example. Data, such as the position of the vehicle 152 along the rail track 106, can be received by the controller/processor 134 by a suitable type of interface 136, and can be stored in the memory 132, which can be any suitable type of computer readable and programmable memory.

Calculations and determinations are performed by the controller/processor 134, which can be any suitable type of computer processor. The controller/processor 134 can be associated with, or incorporated into, any suitable type of computing device, for example, a personal computer, a programmable logic controller, or an application specific integrated circuit (ASIC), for example. The controller/processor 134 controls the selective driving of the motor 144 based upon the received at least one signal from the at least one sensor 150. The memory 132, the controller/processor 134, and the interface 136 and any associated computer readable media are in communication with one another by any suitable type of data bus, as is well known in the art.

The memory 132 can be one or more of a Secure Digital (SD) card or a MultiMediaCard (MMC) card, among others, for example. Also, examples of computer readable media, as can be used as the memory 132, can include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to memory 132, or in place of memory 132, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Figure 1:
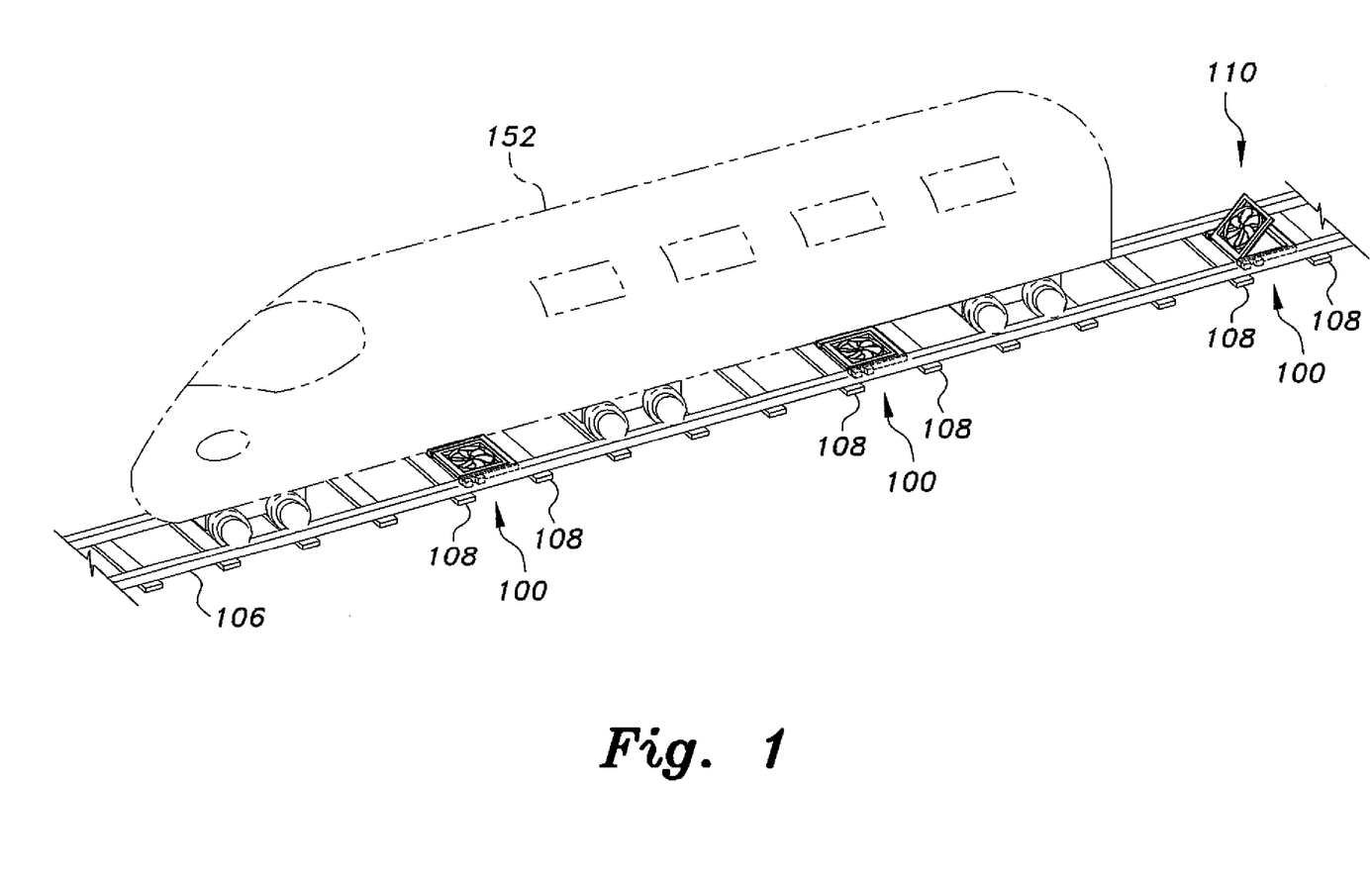
FIG. 1 is an environmental view of embodiments of a plurality of rail mounted wind turbines respectively illustrated in an upward position and in a downward position according to the present invention.

As shown in FIG. 1, a plurality of rail mounted wind turbines 100 can be implemented depending on the particular use, application, or a user's needs. The plurality of wind turbines 100 can be positioned along the rail track 106 between the ties 108 of the rail track 106 depending on the particular use, or application, or a user's needs, for example. Further, at least one controller/processor 134 or at least one generalized system 128 can be associated with a corresponding plurality of rail mounted wind turbines 100 positioned between the rails of the rail track 106, such as between corresponding ties 108. The at least one controller/processor 134 can be adapted to control the selective movement of at least one corresponding pivotable housing 104 of a respective corresponding at least one of the plurality of rail mounted wind turbines 100 into the at least one upward position 110 and into the at least one downward position 112 relative to the rail track 106, for example.

The control by the at least one controller/processor 134 of the selective movement of the corresponding at least one pivotable housing 104 can be based, for example, upon the at least one signal received from the at least one sensor 150. The at least one signal from the at least one sensor 150 can indicate at least one relative position of a vehicle 152 operating on the rail track 106 as can be related to a position of one or more of the plurality of rail mounted wind turbines 100. However, it should be understood, that depending on the particular use, application or a user's needs and the arrangement of the plurality of rail mounted wind turbines 100, more than one controller/processor 134 or more than one generalized system 128 can be implemented in the control of the plurality of the rail mounted wind turbines 100, as can be based on one or more signals received from one or more sensors 150.

It is to be understood that the present invention is not limited to the embodiments described above, but encompasses any and all embodiments within the scope of the following claims.

I claim:

1. A rail mounted wind turbine, comprising:
  a pivotable housing, the pivotable housing adapted for positioning in conjunction with a rail track, the pivotable housing being selectively positioned into at least one upward position relative to the rail track and into at least one downward position relative to the rail track;
  a wind turbine, the wind turbine positioned within the pivotable housing, the wind turbine having at least one blade movable in a path when a wind force is applied to the at least one blade to provide mechanical energy to generate electrical power;
  an electrical generator communicating with the wind turbine, the electrical generator to generate electrical power from the mechanical energy generated by the movement of the at least one blade of the wind turbine, the generated mechanical energy driving the electrical generator to generate the electrical power;
  a controller, the controller adapted to control selective movement of the pivotable housing into the at least one upward position relative to the rail track and into the at least one downward position relative to the rail track; and
  at least one sensor, the at least one sensor associated with the rail mounted wind turbine, the at least one sensor adapted to communicate with the controller to provide at least one signal to the controller indicating at least one relative position of a vehicle operating on the rail track in relation to the pivotable housing.

2. The rail mounted wind turbine according to claim 1, wherein the at least one sensor is selected from the group consisting of an acoustic sensor, a vibrational sensor, an infrared (1R) sensor, a pressure sensor, and a heat sensor.

3. The rail mounted wind turbine according to claim 1, further comprising:
  a pivoting mechanism to selectively move the pivotable housing into the at least one upward position relative to the rail track and into the least one downward position relative to the rail track.

4. The rail mounted wind turbine according to claim 3, wherein the pivoting mechanism is associated with a motor to drive the selective movement of the pivotable housing.

5. The rail mounted wind turbine according to claim 4, wherein the controller, based upon the received at least one signal from the sensor, selectively drives the motor to selectively move the pivoting mechanism to selectively move the pivotable housing into the at least one upward position relative to the rail track and into the least one downward position relative to the rail track.

6. The rail mounted wind turbine according to claim 5, wherein the pivoting mechanism includes an axle to rotatably move the pivotable housing.

7. The rail mounted wind turbine according to claim 1, further comprising:
  a motor, the motor being in communication with the pivotable housing, the motor being controlled by the controller to selectively drive movement of the pivotable housing to selectively move the pivotable housing into the at least one upward position relative to the rail track and into the least one downward position relative to the rail track, based upon the received at least one signal from the sensor.

8. The rail mounted wind turbine according to claim 1, wherein the controller includes a memory, an interface, and a processor, the processor controlling the selective driving of the motor based upon the received at least one signal from the sensor.

9. The rail mounted wind turbine according to claim 1, wherein the electrical generator is adapted to generate electrical power when the pivotable housing is positioned into one or more of the at least one upward position relative to the rail track and the at least one downward position relative to the rail track, in conjunction with the movement of the at least one blade of the wind turbine, when the wind force is applied to the at least one blade of the wind turbine.

10. The rail mounted wind turbine according to claim 1, wherein the at least one blade of the wind turbine is adapted to be selectively movable when the wind force is applied to the at least one blade when the pivotable housing is positioned into one or more of the at least one upward position relative to the rail track and the at least one downward position relative to the rail track to generate the mechanical energy to drive the electrical generator.

11. The rail mounted wind turbine according to claim 10, wherein the vehicle operating on the rail track generates the wind force that is applied to the at least one blade of the wind turbine.

12. The rail mounted wind turbine according to claim 11, wherein the vehicle is selected from the group consisting of a passenger train, a freight train, a subway car, a street car, and a cable car.

13. The rail mounted wind turbine according to claim 1, wherein the vehicle is selected from the group consisting of a passenger train, a freight train, a subway car, a street car, and a cable car.

14. The rail mounted wind turbine according to claim 1, wherein the controller comprises at least one controller associated with a corresponding plurality of rail mounted wind turbines positioned in conjunction with the rail track, the at least one controller adapted to control selective movement of at least one corresponding pivotable housing of a respective corresponding at least one of the plurality of rail mounted wind turbines into the at least one upward position relative to the rail track and into the at least one downward position relative to the rail track, the control of the selective movement being based upon the at least one signal received from the at least one sensor, indicating at least one relative position of a vehicle operating on the rail track in relation to a position of one or more of the plurality of rail mounted wind turbines.

15. The rail mounted wind turbine according to claim 1, wherein the electrical generator is in communication with an energy storage device to receive the generated electrical power.

16. The rail mounted wind turbine according to claim 15, wherein the energy storage device is selected from the group consisting of a power grid, one or more capacitive storage devices, and one or more batteries.

17. A rail mounted wind turbine, comprising:
  a pivotable housing, the pivotable housing adapted for positioning between a plurality of ties in a railroad track in conjunction with the railroad track; the pivotable housing adapted for placement into at least one upward position relative to the railroad track and into at least one downward position relative to the railroad track by a pivoting mechanism associated with the pivotable housing; and
  a wind turbine, the wind turbine positioned within the pivotable housing, the wind turbine having at least one blade rotatable in a path relative to a center point of the wind turbine when a wind force is applied to the at least one blade to provide mechanical energy to generate electrical power, the wind turbine being in communication with an electrical generator to generate the electrical power.

18. The rail mounted wind turbine according to claim 17, wherein the pivoting mechanism comprises an axle in conjunction with a motor.

19. The rail mounted wind turbine according to 17, further comprising:
  a motor, the motor positioned in conjunction with the pivoting mechanism to selectively drive a pivotable movement of the pivoting mechanism; and
  a controller, the controller adapted to control selective movement of the motor to drive the pivoting mechanism to selectively move the pivotable housing into the at least one upward position relative to the railroad track and into the at least one downward position relative to the railroad track.

20. The rail mounted wind turbine according to 19, further comprising:
  at least one sensor, the at least one sensor associated with the rail mounted wind turbine, the at least one sensor adapted to communicate with the controller to provide at least one signal to the controller indicating at least one relative position of a vehicle operating on the railroad track in relation to the pivotable housing.

* * * * *